US012743655B2

(12) United States Patent
Liu et al.

(10) Patent No.: US 12,743,655 B2
(45) Date of Patent: Sep. 22, 2026

(54) SYSTEM AND METHOD FOR UNSUPERVISED LEARNING OF SEGMENTATION TASKS

(71) Applicant: Samsung Electronics Co., Ltd., Gyeonggi-do (KR)

(72) Inventors: Qingfeng Liu, San Diego, CA (US); Mostafa El-Khamy, San Diego, CA (US); Yuewei Yang, Durham, NC (US)

(73) Assignee: Samsung Electronics Co., Ltd (KR)

( * ) Notice: Subject to any disclaimer, the term of this patent is extended or adjusted under 35 U.S.C. 154(b) by 810 days.

(21) Appl. No.: 17/825,391

(22) Filed: May 26, 2022

(65) Prior Publication Data

US 2023/0050573 A1 Feb. 16, 2023

Related U.S. Application Data

(60) Provisional application No. 63/232,848, filed on Aug. 13, 2021.

(51) Int. Cl.
*G06N 20/00* (2019.01)
*G06V 10/762* (2022.01)
*G06V 10/77* (2022.01)

(52) U.S. Cl.
CPC ........... *G06N 20/00* (2019.01); *G06V 10/763* (2022.01); *G06V 10/7715* (2022.01)

(58) Field of Classification Search
CPC ... G06N 20/00; G06V 10/763; G06V 10/7715
See application file for complete search history.

(56) References Cited

U.S. PATENT DOCUMENTS 10,747,986 B2 8/2020 Chefd'hotel et al.
2022/0012637 A1 1/2022 Rezazadegan Tavakoli et al.

FOREIGN PATENT DOCUMENTS

| | | |
|---|---|---|
| CN | 109360206 | 2/2019 |
| CN | 111680702 | 9/2020 |
| CN | 112487190 | 3/2021 |
| CN | 112529878 | 3/2021 |
| CN | 113223037 | 8/2021 |

OTHER PUBLICATIONS

Trosten et al., "Reconsidering Representation Alignment for Multi-view Clustering", Jun. 19-25, 2021, Proceedings of the IEEE/CVF Conference on Computer Vision and Pattern Recognition (CVPR), pp. 1255-1265 (Year: 2021).*
Jang Hyun Cho et al., "PICIE: Unsupervised Semantic Segmentation Using Invariance and Equivariance in Clustering", CVPR 2021, 20 pages.

(Continued)

*Primary Examiner* — David F Dunphy
(74) *Attorney, Agent, or Firm* — The Farrell Law Firm, P.C.

(57) ABSTRACT

Apparatuses and methods are provided for training a feature extraction model determining a loss function for use in unsupervised image segmentation. A method includes determining a clustering loss from an image; determining a weakly supervised contrastive loss of the image using cluster pseudo labels based on the clustering loss; and determining the loss function based on the clustering loss and the weakly supervised contrastive loss.

16 Claims, 6 Drawing Sheets

(56) References Cited

OTHER PUBLICATIONS

Pranny Khosla et al., “Supervised Contrastive Learning”, 34th Conference on Neural Information Processing Systems (NEURIPS 2020), 23 pages.
Daniel J. Trosten et al., “Reconsidering Representation Alignment for Multi-view Clustering”, CVPR 2021, 11 pages.
Jang Hyun Cho et al., “PICIE: Unsupervised Semantic Segmentation Using Invariance and Equivariance in Clustering”, CVPR 2021, 11 pages.
Quan T. Ngo et al., “Facial Expression Recognition Based on Weighted-Cluster Loss and Deep Transfer Learning Using a Highly Imbalanced Dataset”, Sensors, 2020, 21 pages.
German Office Action dated Jun. 5, 2026 issued in counterpart application No. DE 10 2022 114 631.6, 8 pages.

* cited by examiner

SYSTEM AND METHOD FOR UNSUPERVISED LEARNING OF SEGMENTATION TASKS

CROSS-REFERENCE TO RELATED APPLICATION(S)

This application is based on and claims priority under 35 U.S.C. § 119 (e) to U.S. Provisional Patent Application Ser. No. 63/232,848, which was filed in the U.S. Patent and Trademark Office on Aug. 13, 2021, the entire content of which is incorporated herein by reference.

FIELD

The disclosure relates generally to systems and methods for image segmentation in an unsupervised fashion using clustering and contrastive methods.

BACKGROUND

Image semantic segmentation is a computer vision task to label each pixel in an image. Deep learning models have demonstrated the ability to extract visual features from images and accurately classify the target class of each pixel. Supervised learning models minimize cross entropy between target classes and predicted classes. However, obtaining labels for each of the pixels in a large number of images is resource intensive and inefficient.

A current trend in image classification is to pretrain a deep learning model via unsupervised learning algorithms. Among these algorithms clustering and contrastive learning are effective methods. A general idea of clustering and contrastive learning is to group/cluster similar features closer in an embedding space and dissimilar features further apart. Clustering methods can work on pixel features of original images, but conventional contrastive learning method require features from transformed views of the same image.

SUMMARY

Accordingly, this disclosure is provided to address at least the problems and/or disadvantages described above and to provide at least some of the advantages described below.

An aspect of the disclosure is to provide systems and methods for image segmentation in an unsupervised fashion using clustering and contrastive methods.

Another aspect of the disclosure is to provide systems and methods for image segmentation using region level sampling and pooling to maintain continuity of neighboring pixels.

Another aspect of the disclosure is to provide systems and methods for image segmentation using clustering and contrastive effects to provide stabilized centroid learning during training.

Another aspect of the disclosure is to provide systems and methods for image segmentation using box sampling to preserve similarities between neighboring pixels by average pooling a region to a square feature map.

In accordance with an aspect of the disclosure, a method is provided for training a feature extraction model by determining a loss function for use in unsupervised image segmentation. The method includes determining a clustering loss from an image; determining a weakly supervised contrastive loss of the image using cluster pseudo labels based on the clustering loss; and determining the loss function based on the clustering loss and the weakly supervised contrastive loss.

In accordance with another aspect of the disclosure, an apparatus is provided for training a feature extraction model by determining a loss function for use in unsupervised image segmentation. The apparatus includes a processor; and a memory configured to store instructions, which when executed, control the processor to determine a clustering loss from an image, determine a weakly supervised contrastive loss of the image using cluster pseudo labels based on the clustering loss, and determine the loss function based on the clustering loss and the weakly supervised contrastive loss.

In accordance with another aspect of the disclosure, a method is provided for training a feature extraction model by determining a loss function for use in unsupervised image segmentation. The method includes determining a clustering loss from an image; determining a box sample loss of the image; and determining the loss function based on the clustering loss and the box sample loss.

In accordance with another aspect of the disclosure, an apparatus is provided for training a feature extraction model by determining a loss function for use in unsupervised image segmentation. The apparatus includes a processor; and a memory configured to store instructions, which when executed, control the processor to determine a clustering loss from an image, determine a box sample loss of the image, and determine the loss function based on the clustering loss and the box sample loss.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
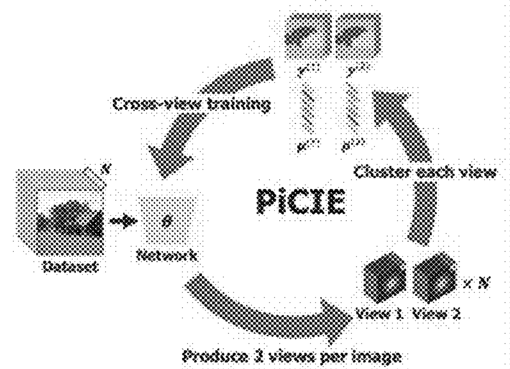
FIG. 1 illustrates an overview of pixel-level feature clustering using invariance and equivariance (PiCIE) and transformations used to generate multi-view features.
Figure 1:
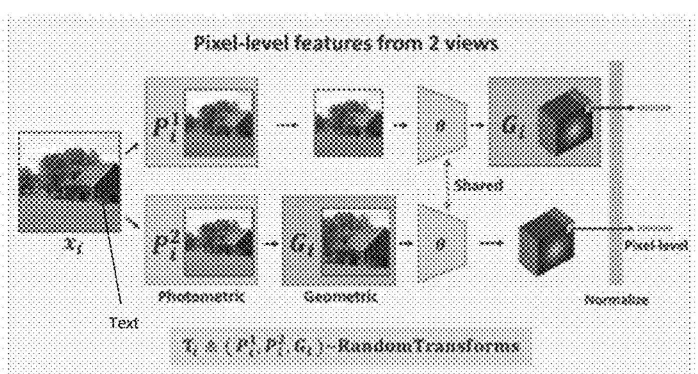

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Image segmentation is a computer vision task that classifies each pixel in an image as a target class. Supervised learning learns to classify by training on labeled data. Compared to image classification tasks, segmentation tasks require many more labels since all hundreds of thousand pixels in an image should be labeled.

Unsupervised learning, on the other hand, learns to classify without any ground truth labels. Unsupervised learning methods may be used train a model on unlabeled data to reduce human effort in annotating the image with pixel labels. For example, clustering is an example of unsupervised learning, which groups features based on similarities.

With recent advances in contrastive learning for image classification tasks, in accordance with an embodiment of the disclosure, a method is provided for training a model with a clustering loss and a contrastive loss to classify pixels without obtaining any ground truth labels.

In addition, in accordance with an embodiment of the disclosure, a box sampling process is introduced to extract random sized regions from a feature map and compute the contrastive loss jointly with pixel features. This mechanism encourages the model to assign the same label to a region, which preserves the label continuity between the neighboring pixels.

An extension of this work is also provided, which jointly trains both a supervised loss and an unsupervised loss with limited number of ground truth labels.

In accordance with an embodiment of the disclosure, a system and method are provided for image segmentations in an unsupervised fashion using both clustering and contrastive methods.

Generally, conventional clustering methods for image segmentation learn cluster centroids and generate pseudo labels for training pixels. However, the generated pseudo labels are often very noisy since pixels belonging to the same class may be assigned different labels due to differences in texture.

In contrast, contrastive learning encourages pixels with high similarity to be mapped closer together and further away from dissimilar pixels. This attraction and repulsion effect can alleviate some of the noise problem in cluster learning.

In addition to the contrastive learning loss, a novel mechanism resembling region sampling in object detection tasks is developed to random sample boxes from the output feature maps and then apply contrastive loss on the extracted region.

Some aspects of the disclosure include:

1) Clustering Loss: Before each training epoch, cluster centroids are learned using current pixel features.

Thereafter, each pixel is given a cluster label as a pseudo label. During the training epoch, the cross entropy between the pseudo labels and the predicted labels is minimized.

2) Weakly Supervised Contrastive Loss: A weakness of the unsupervised contrastive loss is the inclusion of many false negatives during contrasting. By adapting the image classification contrastive loss to pixel classification, the amount of false negatives increases further. To obviate this false negative problem, a weakly supervised contrastive loss may be learned by using the cluster pseudo labels as a cue to guide supervised contrastive loss. A number of pixels are sampled to compute the supervised contrastive loss in order to reduce the computational burden.

3) Box Sampling: Both aspects 1) and 2) above compute loss with respect to individual pixels. However, this may suppress the continuity of neighboring pixels within a same object/stuff class. To encourage assigning the same label to a region of an image, random box sampling may be applied to extract rectangular regions with different sizes from a feature map, and average pooling the region to produce square features. These square features may also be given pseudo labels by counting the majority pixel pseudo labels in the corresponding regions. Thereafter, the average pooled features and respective pseudo labels may be used to compute the supervised contrastive loss again. By learning a high similarity between similar regions, a model is more likely to assign the same labels to a region.

Accordingly, the disclosure addresses some of the problems identified above by providing an extension of image contrastive losses to pixel segmentations, joining training clustering and weakly-supervised contrastive loss in order to improve the quality of the learned pixel representations, and in addition to pixel level contrastive learning, adapting region level sampling and pooling to maintain the continuity of neighboring pixels.

By training a model by matching the similarities of features from different classes without any ground truth labels, the effort to acquire a vast volume of such labels is not necessary.

Additionally, fine-tuning the pre-trained model with a limited amount of labels can provide better performance to a fully supervised model trained on the same amount of labels.

Notation Glossary $x_i \sim \mathcal{D}$ Images from a data domain.

$x_i \sim \mathcal{B}$ Images from a mini training batch.

$f_\theta(.)$ Feature extraction model parameterized by $\theta$.

$$P_i^{(1)},$$

$$P_i^{(2)}$$

Random photometric transformation.

$G_i$ Random geometric transformation.

$\mu^{(.)}$ Cluster centroid.

$y^{(.)}$ Cluster label/Pseudo label.

$$z_{i,p}^{(.)}$$

$$z_{i,p}^{bank}$$

Pixel feature extracted from $i^{th}$ image at location $p \in [HW]$.

Pixel feature stored in a memory bank.

In general, the following points will be discussed below:

Clustering method for unsupervised segmentation (e.g., PiCIE);

Adaptation of contrastive losses to image segmentation;

Modification to supervised contrastive loss for segmentation; and

Box sampling for better region continuity.

Clustering Method for Unsupervised Segmentation

DeepCluster is a self-supervision approach for learning image representations. DeepCluster iteratively groups features with a standard clustering algorithm, k-means, and uses the subsequent assignments as supervision to update the weights of the network.

Similar to DeepCluster, PiCIE clusters all pixel features after each training epoch and assigns cluster labels as pseudo labels to each pixel in the training data. These pseudo labels will guide the loss function to predict the class of each pixel.

Different from DeepCluster, in which features from a single view of the images are extracted, PiCIE features two different views of images being extracted and two losses that compute within-view loss and cross-view loss. The losses improve the equivariance to geometric transformations and invariance to photometric transformations.

FIG. 1 illustrates an overview of PiCIE and transformations used to generate multi-view features.

Referring to FIG. 1, an image $x_i$ is applied a photometric transformation, $$P_i^{(.)},$$

and a geometric transformation, $G_i$, in different orders to generate two views of extracted features, $$z_{i,:}^{(1)} \text{ and } z_{i,:}^{(2)}.$$

Then two sets of centroids, $\mu^{(1)}$, $\mu^{(2)}$, and pseudo labels, $y^{(1)}$, $y^{(2)}$, are computed on the two sets of extracted features using K-means.

After assigning the corresponding pseudo labels, the features are extracted again with different geometric and photometric transformations. With the assigned pseudo labels and computed centroids, a clustering loss function, as shown in Eq. 1 below, is learned, where d(.,.) is a distance metric.

To utilize both views of the image and strengthen the quality of the representations, a within-view loss, as in Eq. 2, and a cross-view loss, as shown Eq.3, may be applied to encourage the model to be invariant to different photometric and geometric transformations.

$$\mathcal{L}_{cluster}(z_{ip}^{(.)}, y_{ip}^{(.)}, \mu^{(.)}) = -\log\left(\frac{e^{-d(z_{ip}^{(.)}, \mu_{y_{ip}})}}{\sum e^{-d(z_{ip}^{(.)}, \mu_l)}}\right) \quad \text{Eq. 1}$$

-continued $$\mathcal{L}_{within} = \sum_p \mathcal{L}_{cluster}(z_{ip}^{(1)}, y_{ip}^{(1)}, \mu^{(1)}) + \mathcal{L}_{cluster}(z_{ip}^{(2)}, y_{ip}^{(2)}, \mu^{(2)}) \quad \text{Eq. 2}$$

$$\mathcal{L}_{cross} = \sum_p \mathcal{L}_{cluster}(z_{ip}^{(1)}, y_{ip}^{(2)}, \mu^{(2)}) + \mathcal{L}_{cluster}(z_{ip}^{(2)}, y_{ip}^{(1)}, \mu^{(1)}) \quad \text{Eq. 3}$$

$$\mathcal{L}_{CLUSTER} = \mathcal{L}_{within} + \mathcal{L}_{cross} \quad \text{Eq. 4}$$

PiCIE learns a clustering loss, as shown in Eq.4, with two views of the training images. Although PiCIE demonstrates equivariance and invariance of learned features to photometric and geometric transformations, since the pseudo labels are very noisy and time-consuming to generate, the training spends the most time on generating these labels and the clustering effect weakens after longer time training.

Adaptation of Contrastive Losses to Image Segmentation

Contrastive learning is another tool for learning image level representations. The idea of contrastive learning is to map similar features (e.g., positives) closer and dissimilar features (e.g., negatives) further in an embedding space.

In order to learn, a model may be trained via a noise contrastive estimation (NCE) loss, as shown in Eq.5, where d(.,.) is the cosine distance, $z_i$ is the image feature of $i^{th}$ image, and $$z_i^+ \text{ and } z_i^-$$

are positive and negative features with respect to $z_i$.

In unsupervised image classification, positives are features extracted from the same image with different views, and negatives are features extracted from all other images. Successful methods include Simple Framework for Contrastive Learning of Visual Representations (SimCLR), Momentum Contrast (MoCo), Bootstrap Your Own Latent (BYOL), Simple Siamese (SimSiam), etc. The same algorithm may be adapted to image segmentation tasks, e.g., as shown below in Table 1.

$$\mathcal{L}_{NCE} = -\log\left(\frac{e^{d(z_i, z_i^+)}/\tau}{\sum_{z_i^- \in Z^-} e^{d(z_i, z_i^-)/\tau}}\right) \quad \text{Eq. 5}$$

TABLE 1

Adaptation of Contrastive Losses to Segmentation

Algorithm 1 for $x_i$~$\mathcal{D}$ do
  for $x_i$~$\mathcal{B}$ do $P_i^{(1)}, P_i^{(2)}$ ~ Random Photometric Transforms $G_i$~Random Geometric Transforms $z_{i,:}^{(1)} \leftarrow f_\theta(G_i(P_i^{(1)}(x_i)))[:]$ $z_{i,:}^{(2)} \leftarrow f_\theta(G_i(P_i^{(2)}(x_i)))[:]$ end do $\mathcal{L}_{CT} = \mathcal{L}_*(z_{ip}^{(1)}, z_{ip}^{(2)})$ $f_\theta \leftarrow$ backward ($\mathcal{L}_{CT}$)
end for Contrastive Losses

| Image Segmentations | Image Classifications |
|---|---|
| $\mathcal{L}_{SimCLR}(z_{ip}^{(1)}, z_{ip}^{(2)}) = \sum_{k=1,1}^{p=H,W} -\log\left(\frac{e^{-d(z_{ik}^{(1)}, z_{ik}^{(2)})/\tau}}{\sum_{j\neq k} e^{-d(z_{ik}^{(1)}, z_{ij}^{(2)})/\tau}}\right)$ | $\mathcal{L}_{SimCLR}(z_i^{(1)}, z_i^{(2)}) = \sum_{i=1}^{B} -\log\left(\frac{e^{-d(z_i^{(1)}, z_i^{(2)})/\tau}}{\sum_{j\neq k} e^{-d(z_i^{(1)}, z_j^{(2)})/\tau}}\right)$ |
| $\mathcal{L}_{MoCo}(z_{ip}^{(1)}, z_{ip}^{(2)}) = \sum_{k=1,1}^{p=H,W} -\log\left(\frac{e^{-d(z_{ik}^{(1)}, z_{ik}^{(2)})/\tau}}{\sum_{z_{ij}\in z_{ij}^{bank}} e^{-d(z_{ik}^{(1)}, z_{ij}^{(2)})/\tau}}\right)$ | $\mathcal{L}_{MoCo}(z_i^{(1)}, z_i^{(2)}) = \sum_{i=1}^{B} -\log\left(\frac{e^{-d(z_i^{(1)}, z_i^{(2)})/\tau}}{\sum_{z_j\in z_j^{bank}} e^{-d(z_i^{(1)}, z_j^{(2)})/\tau}}\right)$ |
| $\mathcal{L}_{BYOL}(z_{ip}^{(1)}, z_{ip}^{(2)}) = \sum_{k=1,1}^{p=H,W} \lVert MLP(z_{ik}^{(1)}) - z_{ik}^{(2)*}\rVert_2$ | $\mathcal{L}_{BYOL}(z_i^{(1)}, z_i^{(2)}) = \sum_{i=1}^{B} \lVert MLP(z_i^{(1)}) - z_i^{(2)*}\rVert_2$ |
| $\mathcal{L}_{SWAV}(z_{ip}^{(1)}, z_{ip}^{(2)}) = \sum_{k=1,1}^{p=H,W} \lVert z_{ik}^{(1)} - q_{ik}^{(2)}\rVert_2 + \lVert z_{ik}^{(2)} - q_{ik}^{(1)}\rVert_2$ | $\mathcal{L}_{SWAV}(z_i^{(1)}, z_i^{(2)}) = \sum_{i=1}^{B} \lVert z_i^{(1)} - q_i^{(2)}\rVert_2 + \lVert z_i^{(2)} - q_i^{(1)}\rVert_2$ |

In image classification, the contrasting features, $z_i$, are image vectors that are average-pooled from the feature maps. In segmentations, the contrasting features, $z_{ip}$, are feature vector at location $p \in [H, W]$ of the feature maps.

For images in a mini batch, $\mathcal{B}$, two different sets of photometric transformations, but the same geometric transformation, are applied to each image. Features are extracted from two views of each image and then are used to compute the contrastive loss.

For SimCLR, pixel features at the same location are positive pairs, and pixel features at every other locations are negatives.

For MoCo, pixel features at the same location are positive pairs, and pixel features extracted at previous epochs and stored in a memory bank are negatives. The negative features are extracted using a second encoder that is updated with a momentum.

For BYOL, negatives are not explicitly used, but the mean mode of the batch data is the negative via the batch norm operation through the network. A second encoder may also be used to extract features to be predicted.

For SimSiam, a single encoder is trained but the features to be predicted does not compute the gradient.

SwAV is a self-supervised learning approach that takes advantage of contrastive methods without requiring to compute pairwise comparisons. Specifically, SwAV is a clustering learning method that simultaneously clusters the data while enforcing consistency between cluster assignments produced for different augmentations (or views) of the same image, instead of comparing features directly as in contrastive learning. Simply put, SwAV uses a swapped prediction mechanism which predicts the cluster assignment of a view from the representation of another view.

Figure 2:
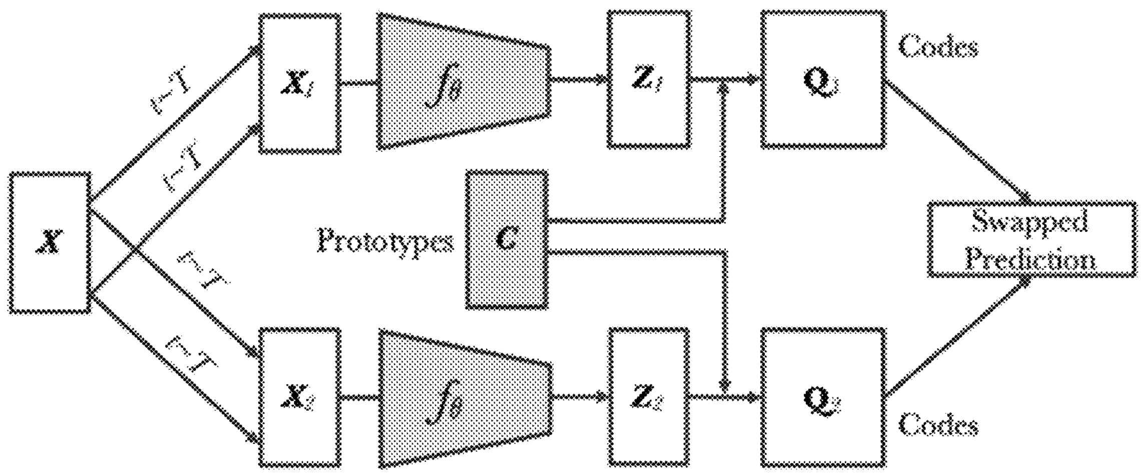
FIG. 2 illustrates an overview of a Swapping Assignments between Views (SwAV) method.

FIG. 2 illustrates an overview of a SwAV method.

Referring to FIG. 2, unlike PiCIE that uses computed centroids as weights for a non-parametric classifier, SwAV trains learnable prototypes, and computes codes based on the distances between features and closest prototypes. Then the codes are swapped to be predicted by the features from a different view.

The contrastive learning demonstrates dominant performance to learn the image-level features that classify the images close to supervised learning upper bound without any labels. Nonetheless, the adaptation to image segmentation is not simple, because of two existing problems with segmentation data:

1. The number of false negatives in a training batch is relatively large; and
2. The classes are very imbalanced in a segmentation dataset.

Since only pixel features at the same location are positives and every other features are negative, there are many pixel features belonging to the same class that are treated as negatives in the loss function. This leads to a noisy learning signal.

In a segmentation dataset, some category classes dominate a portion of the total pixels, such as roads, buildings in the CityScapes dataset, etc. As such, benefits of directly adapting image classification contrastive learning losses to image segmentation are limited due to the aforementioned problems.

To obviate the types shortcomings described above, in accordance with an embodiment of the disclosure, systems and methods are provided for image segmentation in an unsupervised fashion using clustering and contrastive methods.

Modification to Supervised Contrastive Loss for Segmentation

To address the false negative and the data imbalance problems, instead of totally unsupervised contrastive losses, weakly supervised contrastive loss is developed for image segmentation.

As described above, PiCIE may be used to generate pseudo labels for each pixel. These pseudo labels can then be used as guidance to indicate similar features belonging to the same class. Using the pseudo labels, a supervised version of Eq.5 may be developed.

Figure 3:
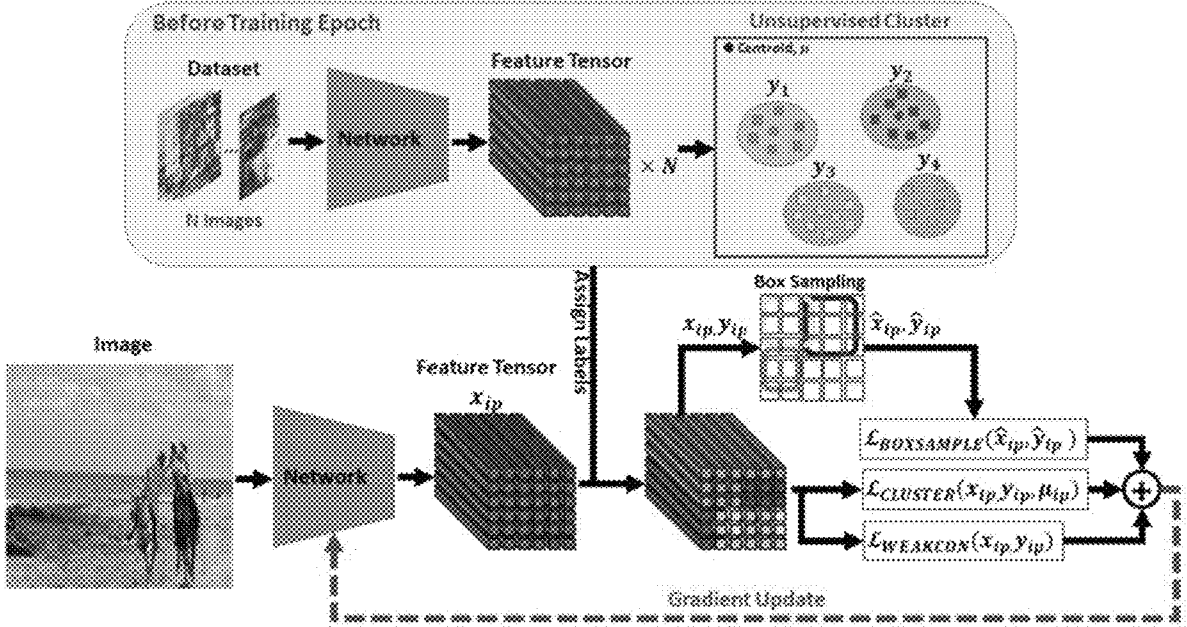
FIG. 3 illustrates an example of a modification to supervised contrastive loss for segmentation, according to an embodiment.

FIG. 3 illustrates an example of a modification to supervised contrastive loss for segmentation, according to an embodiment.

Referring to FIG. 3, after extracting pixel features, in addition to the cluster loss, a supervised contrastive loss may be computed based on the pseudo labels. Random samples of all pixel features may be used for the supervised contrastive loss so that there is a slight increase in the computational requirement.

In Eq.6, |Z(i)| is a number of features that have the same class label, i. In this loss function, the positives and negatives are decided based on a generated pseudo label, $y_i$. An additional hyper parameter is introduced during the sampling, number of samples, $N_{samples}$.

$$\mathcal{L}_{WEAKCON}(z_i^{(.)}, y_i^{(.)}) = \mathcal{L}_{con}(z_i^{(.)}, y_i^{(.)}) = \sum_i -\frac{1}{|Z(i)|} \sum_{z_j \in Z\{y_j = y_i\}} \log\left(\frac{e^{-d(z_i, z_j)/\tau}}{\sum_{z_k \in Z\{y_k \neq y_i\}} e^{-d(z_i, z_k)/\tau}}\right) \quad \text{Eq. 6}$$

More specifically, referring to FIG. 3, before each training epoch, cluster centroids are learned using current pixel features. Thereafter, each pixel is given a cluster label as pseudo label.

Thereafter, during the training epoch, the cross entropy between the pseudo labels and the predicted labels is minimized.

The weakness of the unsupervised contrastive loss is the inclusion of many false negatives during contrasting. Additionally, by adapting the image classification contrastive loss to pixel classification, the amount of false negatives may increase further.

Therefore, to mollify the false negative problem, a weakly supervised contrastive loss is learned by using the cluster pseudo labels as the cue to guide the supervised contrastive loss. A number of pixels are sampled to compute the supervised contrastive loss to reduce the computational burden.

Box Sampling for Better Region Continuity

To improve label assignment continuity between neighboring pixels, box sampling or region sampling may be used in object detection tasks.

More specifically, referring again to FIG. 3, after a dense feature is extracted through a backbone network, random sized regions/boxes may be extracted from the feature map and each region/box is classified as object or non-object.

In the segmentation task, box sampling is applied in order to extract $N_{regions}$ regions from the feature map, and average pooling is performed on the sampled regions s×s to output features, $$\hat{z}_i^{(.)}.$$

The resultant features compute the average information of all pixels in a region.

In order to compute a supervised contrastive loss on these features, the same label, $\hat{y}_i$, is given to all feature vectors in the average-pooled features by computing the majority labels in the region, $\hat{y}_i = \text{argmax}_{y_i \in box} |y_i|$, where $|y_i|$ is the number of $y_i$ in a sampled box.

Figure 4:
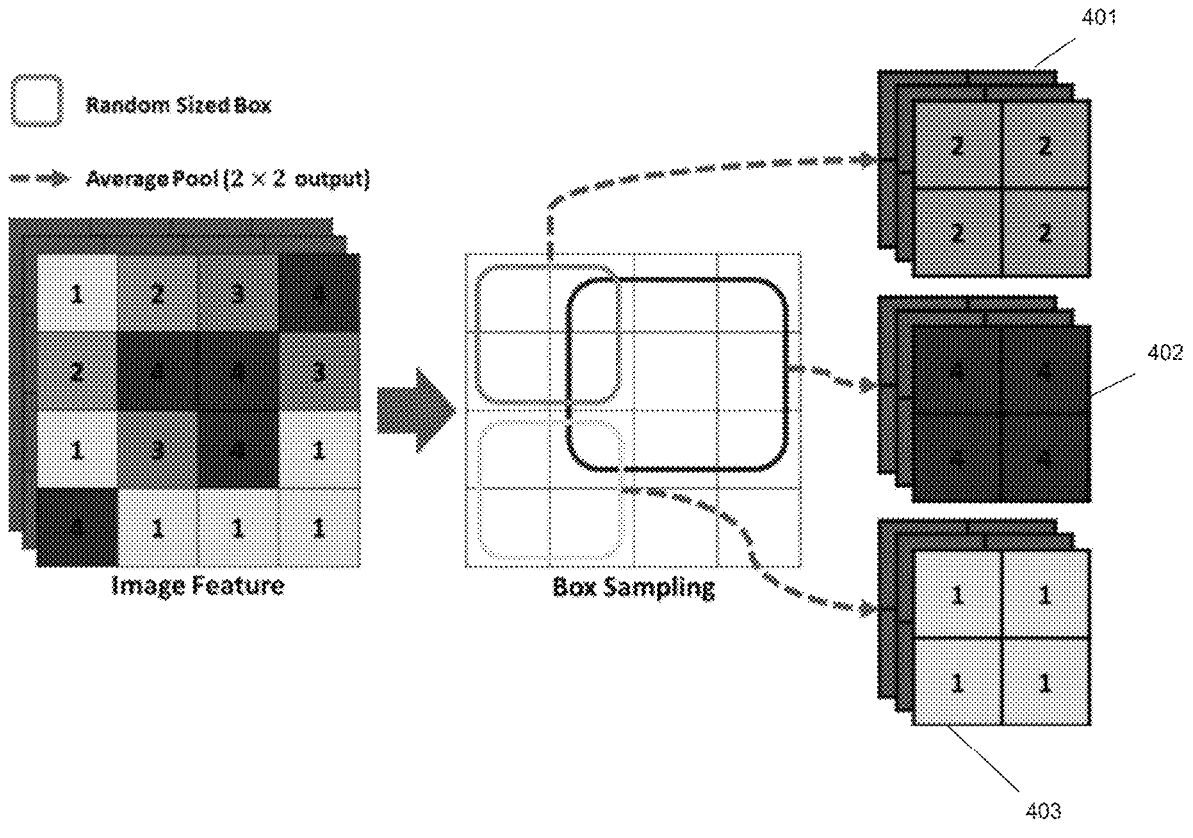
FIG. 4 illustrates an example of a box sampling process, according to an embodiment.

FIG. 4 illustrates an example of a box sampling process according to an embodiment.

Referring to FIG. 4, average pooling is performed on the sampled regions to 2×2 output features. The same labels are then given to all feature vectors in the average-pooled features by computing the majority labels in the regions. For examples, pseudo label 2 is given in region 401, pseudo label 4 is given in region 402, and pseudo label 1 is given in region 403.

Accordingly, in addition to Eq.5 and Eq.6, another supervised contrastive loss on the randomly sampled square features may also computed in Eq.7.

$$\mathcal{L}_{boxsample}(\hat{z}_i^{(\cdot)}, \hat{y}_i^{(\cdot)}) = \sum_i -\frac{1}{|\hat{Z}(i)|} \sum_{\hat{z}_j \in \hat{Z}\{\hat{y}_j = \hat{y}_i\}} \log\left(\frac{e^{-d(\hat{z}_i, \hat{z}_j)/\tau}}{\sum_{\hat{z}_j \in \hat{Z}\{\hat{y}_k \neq \hat{y}_i\}} e^{-d(\hat{z}_i, \hat{z}_k)/\tau}}\right) \quad \text{Eq. 7}$$

A final loss function to train the system may be expressed as Eq.8.

$$\mathcal{L}_{total} = \mathcal{L}_{CLUSTER} + \eta_1 * \mathcal{L}_{WEAKCON} + \eta_2 * \mathcal{L}_{BOXSAMPLE} \quad \text{Eq. 8}$$

TABLE 2

Algorithm 2

S = Box Sampler for $x_i \sim \mathcal{D}$ do $P_i^{(1)}, P_i^{(2)} \sim$ Random Photometric Transforms $G_i \sim$ Random Geometric Transforms $z_{i,:}^{(1)} \leftarrow G_i(f_\theta(P_i^{(1)}(x_i)))[:]$ $z_{i,:}^{(2)} \leftarrow f_\theta(G_i(P_i^{(2)}(x_i)))[:]$ end for $\mu^{(1)}, y^{(1)} \leftarrow KMeans(\{z_{ip}^{(1)}: i \in [N], p \in [HW]\})$ $\mu^{(2)}, y^{(2)} \leftarrow KMeans(\{z_{ip}^{(2)}: i \in [N], p \in [HW]\})$ for $x_i \sim \mathcal{D}$ do $z_{i,:}^{(1)} \leftarrow G_i(f_\theta(P_i^{(1)}(x_i)))[:]$ $z_{i,:}^{(2)} \leftarrow f_\theta(G_i(P_i^{(2)}(x_i)))[:]$ $R_i \sim$ Random Sampling $\tilde{z}_{i,:}^{(1)}, \tilde{y}_i^{(1)} \leftarrow R_i(z_{i,:}^{(1)}, y^{(1)})$ TABLE 2-continued Algorithm 2

$\tilde{z}_{i,:}^{(2)}, \tilde{y}_i^{(2)} \leftarrow R_i(z_{i,:}^{(2)}, y^{(2)})$ boxes ← S.generate_boxes( )

$\hat{z}_{i,:}^{(1)}, \hat{y}_i^{(1)} \leftarrow S_{boxes}(z_{i,:}^{(1)}, y^{(1)})$ $\hat{z}_{i,:}^{(2)}, \hat{y}_i^{(2)} \leftarrow S_{boxes}(z_{i,:}^{(2)}, y^{(2)})$ $\mathcal{L}_{within} \leftarrow \sum_p \mathcal{L}_{cluster}(z_{ip}^{(1)}, y_{ip}^{(1)}, \mu^{(1)}) + \mathcal{L}_{cluster}(z_{ip}^{(2)}, y_{ip}^{(2)}, \mu^{(2)})$ $\mathcal{L}_{cross} \leftarrow \sum_p \mathcal{L}_{cluster}(z_{ip}^{(2)}, y_{ip}^{(2)}, \mu^{(2)}) + \mathcal{L}_{cluster}(z_{ip}^{(2)}, y_{ip}^{(1)}, \mu^{(1)})$ $\mathcal{L}_{CLUSTER} \leftarrow \mathcal{L}_{within} + \mathcal{L}_{cross}$ $\mathcal{L}_{WEAKCON} \leftarrow \mathcal{L}_{con}(\tilde{z}_{i,:}^{(\cdot)}, \tilde{y}_{i,:}^{(\cdot)})$ $\mathcal{L}_{BOXSAMPLE} \leftarrow \mathcal{L}_{con}(\hat{z}_{i,:}^{(\cdot)}, \hat{y}_{i,:}^{(\cdot)})$ $\mathcal{L}_{total} = \mathcal{L}_{CLUSTER} + \eta_1 \times \mathcal{L}_{WEAKCON} + \eta_2 \times \mathcal{L}_{BOXSAMPLE}$ $f_\theta \leftarrow$ backward $(\mathcal{L}_{total})$ end for Hyper parameters are listed in Table 3 below.

TABLE 3

| List of hyper parameters |
| --- |
| $N_{samples}$, Number of features vectors sampled from the feature map to compute $\mathcal{L}_{WEAKCON}$ |
| $N_{regions}$, Number of boxes sampled from the feature map to compute $\mathcal{L}_{BOXSAMPLE}$ |
| s, Output dimension of average-pooled features to compute $\mathcal{L}_{BOXSAMPLE}$ |
| $\eta_1$, Scale on $\mathcal{L}_{WEAKCON}$ |
| $\eta_2$, Scale on $\mathcal{L}_{BOXSAMPLE}$. |

Figure 5:
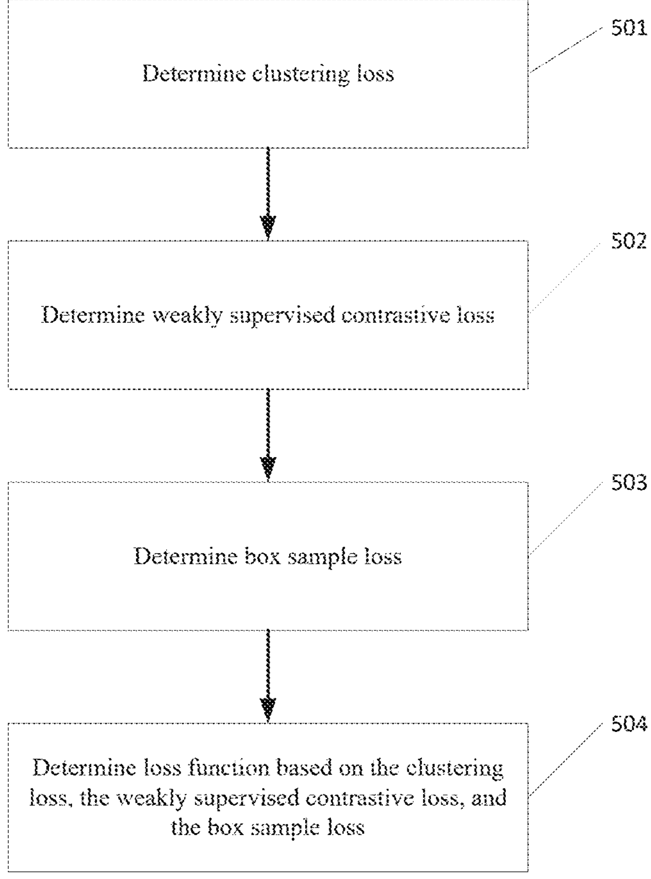
FIG. 5 is a flowchart illustrating a method of calculating a loss function, according to an embodiment.

FIG. 5 is a flowchart illustrating a method of calculating a loss function, according to an embodiment.

Referring to FIG. 5, in step 501, an apparatus, e.g., a mobile phone, determines a clustering loss ($\mathcal{L}_{CLUSTER}$) from an image.

In step 502, the apparatus determines a weakly supervised contrastive loss ($\mathcal{L}_{WEAKCON}$) of the image using cluster pseudo labels based on the clustering loss.

In step 503, the apparatus determines a ($\mathcal{L}_{boxsample}$) of the image.

In step 504, the apparatus determines a loss function ($\mathcal{L}_{total}$) based on the clustering loss, the weakly supervised contrastive loss, and the box sample loss, e.g., using Eq.8.

Although FIG. 5 illustrates a method in which the clustering loss, the weakly supervised contrastive loss, and the box sample loss are used to compute the loss function, the disclosure is not limited thereto. For example, the apparatus may determine a loss function ($\mathcal{L}_{total}$) based on the clustering loss and the weakly supervised contrastive loss (e.g., where $\mathcal{L}_{total} = \mathcal{L}_{CLUSTER} + \eta_1 * \mathcal{L}_{WEAKCON}$), or based on the clustering loss and the box sample loss (e.g., where $\mathcal{L}_{total} = (\mathcal{L}_{CLUSTER}) + \eta_2 * \mathcal{L}_{BOXSAMPLE}$).

Semi Supervised Training for Image Segmentation

In accordance with an embodiment of the disclosure, both labeled and unlabeled images may be trained.

More specifically, the labeled images may be trained by minimizing cross entropy between predicted labels and ground truth labels. The unlabeled images may be trained by computing both the cluster losses, $\mathcal{L}_{within} + \mathcal{L}_{cross}$, and the contrastive loss, $\mathcal{L}_{WEAKCON}$, as described above.

Box sampling can also be included as a mechanism to strengthen the label continuity in a region. A benefit of jointly training supervised losses on limited ground truth labels is that the centroids learned during unsupervised training will be more robust, inducing less noise than when computing the contrastive loss.

TABLE 4

| Algorithm |
| --- |
| for $x_i$, $y_{ip} \sim \mathcal{D}_{labeled}$ do |
| $P_i \sim$ Random Photometric Transforms |
| $G_i \sim$ Random Geometric Transforms |
| $z_{i:} \sim f_\theta(G[_i(P_i(x_i)[])) [:]$ |
| $y_{ip}^{predict} \leftarrow \text{classifier}(z_{ip})$ |
| $\mathcal{L}_{supervised} - CE(y_{ip}^{predict}, y_{ip})$ |
| end for |
| for $x_i \sim \mathcal{D}_{unlabeled}$ do |
| $\mathcal{L}_{unsupervised}$ = Algorithm 2($x_i$) |
| end for |

Figure 6:
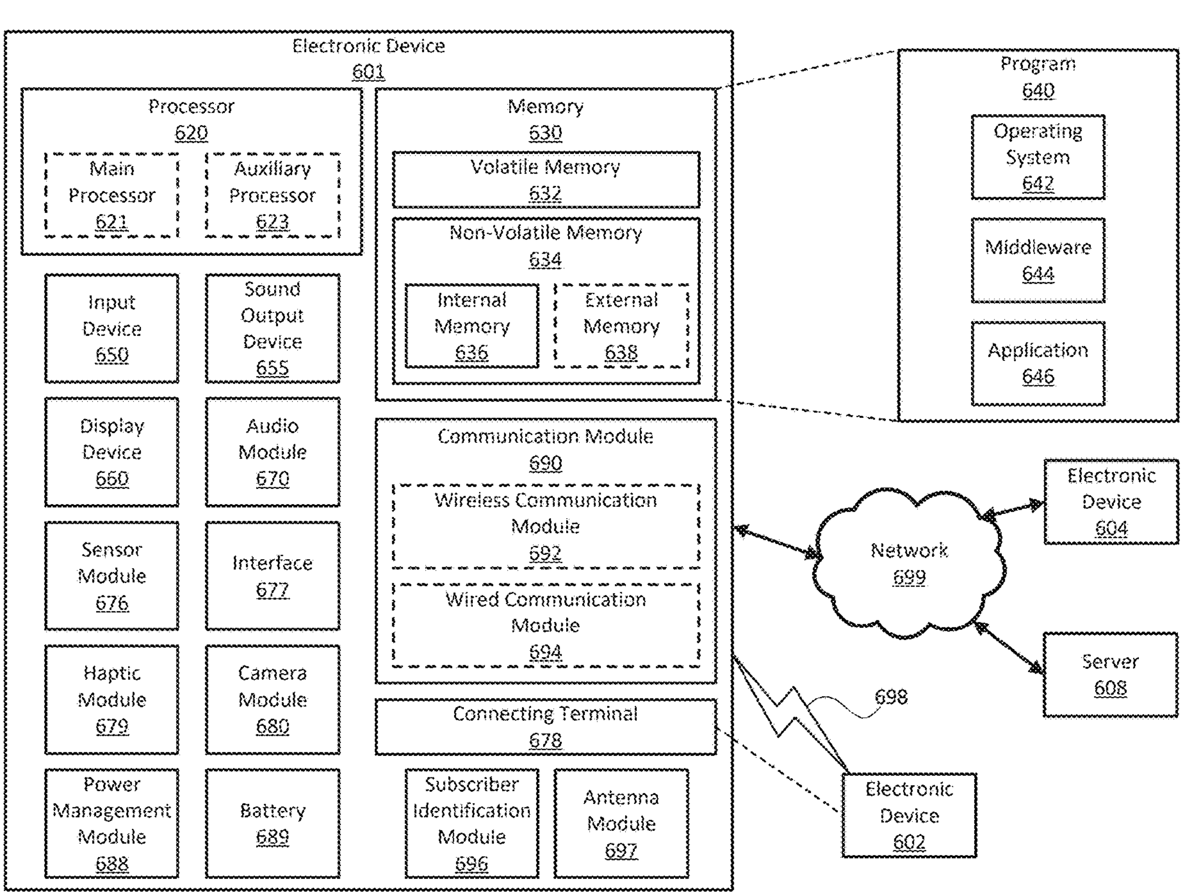
FIG. 6 illustrates an electronic device in a network environment, according to an embodiment.

FIG. 6 illustrates an electronic device in a network environment, according to an embodiment.

Referring to FIG. 6, the electronic device 601, e.g., a mobile terminal including GPS functionality, in the network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697 including a GNSS antenna. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a central processing unit (CPU) or an application processor, and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 655 or a headphone of an external electronic device 602 directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wiredly) or wirelessly. According to one embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. According to one embodiment, the connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. The power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the application processor) and supports a direct (e.g., wired) communication or a wireless communication. According to one embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

One embodiment may be implemented as software (e.g., the program 640) including one or more instructions that are stored in a storage medium (e.g., internal memory 636 or external memory 638) that is readable by a machine (e.g., the electronic device 601). For example, a processor of the electronic device 601 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of training a feature extraction model by determining a loss function for use in unsupervised image segmentation, the method comprising:

determining a clustering loss ($\mathcal{L}_{CLUSTER}$) from an image;

determining a weakly supervised contrastive loss ($\mathcal{L}_{WEAKCON}$) of the image using cluster pseudo labels based on the clustering loss;

determining a box sample loss ($\mathcal{L}_{boxsample}$) of the image; and determining the loss function ($\mathcal{L}_{total}$) based on the clustering loss, the box sample loss, and the weakly supervised contrastive loss.

2. The method of claim 1, wherein the loss function is determined using:

$$\mathcal{L}_{total} = \mathcal{L}_{CLUSTER} + \eta_1 * \mathcal{L}_{WEAKCON} + \eta_2 * \mathcal{L}_{BOXSAMPLE},$$

wherein $\eta_1$ is a scale on the weakly supervised contrastive loss and $\eta_2$ is a scale on the box sample loss.

3. The method of claim 1, wherein determining the box sample loss of the image comprises:

extracting random sized boxes from a feature map of the image;

performing average pooling on each of the extracted boxes; and designating all feature vectors in the average-pooled features of each box with a same label based on a majority of labels in the respective box.

4. The method of claim 1, wherein determining the box sample loss of the image is performed using:

$$\mathcal{L}_{boxsample}\left(\hat{z}_i^{(.)}, \hat{y}_i^{(.)}\right) = \sum_i -\frac{1}{|\hat{Z}(i)|} \sum_{\hat{z}_j \in \hat{Z}\{\hat{y}_j = \hat{y}_i\}} \log\left(\frac{e^{-d(\hat{z}_i, \hat{z}_j)/\tau}}{\sum_{\hat{z}_j \in \hat{Z}\{\hat{y}_k \neq \hat{y}_i\}} e^{-d(\hat{z}_i, \hat{z}_k)/\tau}}\right),$$

wherein $\hat{y}_i = \text{argmax}_{y_i \in box} |y_i|$, where $|y_i|$ is the number of $y_i$ in a sampled box, $$\hat{z}_i^{(.)}$$

represents average information of all pixels in the sampled box, d is a distance metric, and $|Z(i)|$ is a number of features that have a same class label, i.

5. The method of claim 1, wherein determining the weakly supervised contrastive loss of the image is performed using:

$$\mathcal{L}_{WEAKCON}\left(z_i^{(.)}, y_i^{(.)}\right) = \mathcal{L}_{con}\left(z_i^{(.)}, y_i^{(.)}\right) = \sum_i -\frac{1}{|Z(i)|} \sum_{z_j \in Z\{y_j = y_i\}} \log\left(\frac{e^{-d(z_i, z_j)/\tau}}{\sum_{z_k \in Z\{y_k \neq y_i\}} e^{-d(z_i, z_k)/\tau}}\right),$$

wherein d is a distance metric and $|Z(i)|$ is a number of features that have a same class label, i.

6. An apparatus for training a feature extraction model by determining a loss function for use in unsupervised image segmentation, the apparatus comprising:

a processor; and a memory configured to store instructions, which when executed, control the processor to:

determine a clustering loss ($\mathcal{L}_{CLUSTER}$) from an image, determine a weakly supervised contrastive loss ($\mathcal{L}_{WEAKCON}$) of the image using cluster pseudo labels based on the clustering loss, determine a box sample loss ($\mathcal{L}_{boxsample}$) of the image, and determine the loss function ($\mathcal{L}_{total}$) based on the clustering loss, the box sample loss, and the weakly supervised contrastive loss.

7. The method of claim 6, wherein the instructions further control the processor to determine the loss function using:

$$\mathcal{L}_{total} = \mathcal{L}_{CLUSTER} + \eta_1 * \mathcal{L}_{WEAKCON} + \eta_2 * \mathcal{L}_{BOXSAMPLE},$$

wherein $\eta_1$ is a scale on the weakly supervised contrastive loss and $\eta_2$ is a scale on the box sample loss.

8. The apparatus of claim 6, wherein the instructions further control the processor to determine the box sample loss of the image by:

extracting random sized boxes from a feature map of the image;

performing average pooling on each of the extracted boxes; and designating all feature vectors in the average-pooled features of each box with a same label based on a majority of labels in the respective box.

9. The apparatus of claim 6, wherein the instructions further control the processor to determine the box sample loss of the image using:

$$\mathcal{L}_{boxsample}(\hat{z}_i^{(.)}, \hat{y}_i^{(.)}) = \sum_i -\frac{1}{|\hat{Z}(i)|} \sum_{\hat{z}_j \in \hat{Z}\{\hat{y}_j = \hat{y}_i\}} \log\left(\frac{e^{-d(\hat{z}_i, \hat{z}_j)/\tau}}{\sum_{\hat{z}_j \in \hat{Z}\{\hat{y}_k \neq \hat{y}_i\}} e^{-d(\hat{z}_i, \hat{z}_k)/\tau}}\right),$$

wherein $\hat{y}_i = \mathrm{argmax}_{y_i \in box} |y_i|$, where $|y_i|$ is the number of $y_i$ in a sampled box, $$\hat{z}_i^{(.)}$$

represents average information of all pixels in the sampled box, d is a distance metric, and |Z(i)| is a number of features that have a same class label, i.

10. The apparatus of claim 6, wherein the instructions further control the processor to determine the weakly supervised contrastive loss of the image using:

$$\mathcal{L}_{WEAKCON}(z_i^{(.)}, y_i^{(.)}) =$$

$$\mathcal{L}_{con}(z_i^{(.)}, y_i^{(.)}) = \sum_i -\frac{1}{|Z(i)|} \sum_{z_j \in Z\{y_j = y_i\}} \log\left(\frac{e^{-d(z_i, z_j)/\tau}}{\sum_{z_k \in Z\{y_k \neq y_i\}} e^{-d(z_i, z_k)/\tau}}\right),$$

wherein d is a distance metric and |Z(i)| is a number of features that have a same class label, i.

11. A method of training a feature extraction model by determining a loss function for use in unsupervised image segmentation, the method comprising:

determining a clustering loss ($\mathcal{L}_{CLUSTER}$) from an image;

determining a box sample loss ($\mathcal{L}_{boxsample}$) of the image; and determining the loss function ($\mathcal{L}_{total}$) based on the clustering loss and the box sample loss.

12. The method of claim 11, wherein determining the box sample loss of the image comprises:

extracting random sized boxes from a feature map of the image;

performing average pooling on each of the extracted boxes; and designating all feature vectors in the average-pooled features of each box with a same label based on a majority of labels in the respective box.

13. The method of claim 11, wherein determining the box sample loss of the image is performed using:

$$\mathcal{L}_{boxsample}(\hat{z}_i^{(.)}, \hat{y}_i^{(.)}) = \sum_i -\frac{1}{|\hat{Z}(i)|} \sum_{\hat{z}_j \in \hat{Z}\{\hat{y}_j = \hat{y}_i\}} \log\left(\frac{e^{-d(\hat{z}_i, \hat{z}_j)/\tau}}{\sum_{\hat{z}_j \in \hat{Z}\{\hat{y}_k \neq \hat{y}_i\}} e^{-d(\hat{z}_i, \hat{z}_k)/\tau}}\right),$$

wherein $\hat{y}_i = \mathrm{argmax}_{y_i \in box} |y_i|$, where $|y_i|$ is the number of $y_i$ in a sampled box, $$\hat{z}_i^{(.)}$$

represents average information of all pixels in the sampled box, d is a distance metric, and |Z(i)| is a number of features that have a same class label, i.

14. An apparatus for training a feature extraction model by determining a loss function for use in unsupervised image segmentation, the apparatus comprising:

a processor; and a memory configured to store instructions, which when executed, control the processor to:

determine a clustering loss ($\mathcal{L}_{CLUSTER}$) from an image, determine a box sample loss ($\mathcal{L}_{boxsample}$) of the image, and determine the loss function ($\mathcal{L}_{total}$) based on the clustering loss and the box sample loss.

15. The apparatus of claim 14, wherein the instructions further control the processor to determine the box sample loss of the image by:

extracting random sized boxes from a feature map of the image;

performing average pooling on each of the extracted boxes; and designating all feature vectors in the average-pooled features of each box with a same label based on a majority of labels in the respective box.

16. The apparatus of claim 14, wherein the instructions further control the processor to determine the box sample loss of the image using:

$$\mathcal{L}_{boxsample}(\hat{z}_i^{(.)}, \hat{y}_i^{(.)}) = \sum_i -\frac{1}{|\hat{Z}(i)|} \sum_{\hat{z}_j \in \hat{Z}\{\hat{y}_j = \hat{y}_i\}} \log\left(\frac{e^{-d(\hat{z}_i, \hat{z}_j)/\tau}}{\sum_{\hat{z}_j \in \hat{Z}\{\hat{y}_k \neq \hat{y}_i\}} e^{-d(\hat{z}_i, \hat{z}_k)/\tau}}\right),$$

wherein $\hat{y}_i = \mathrm{argmax}_{y_i \in box} |y_i|$, where $|y_i|$ is the number of $y_i$ in a sampled box, $$\hat{z}_i^{(.)}$$

represents average information of all pixels in the sampled box, d is a distance metric, and $|Z(i)|$ is a number of features that have a same class label, i.

* * * * *